Patented Nov. 3, 1925.

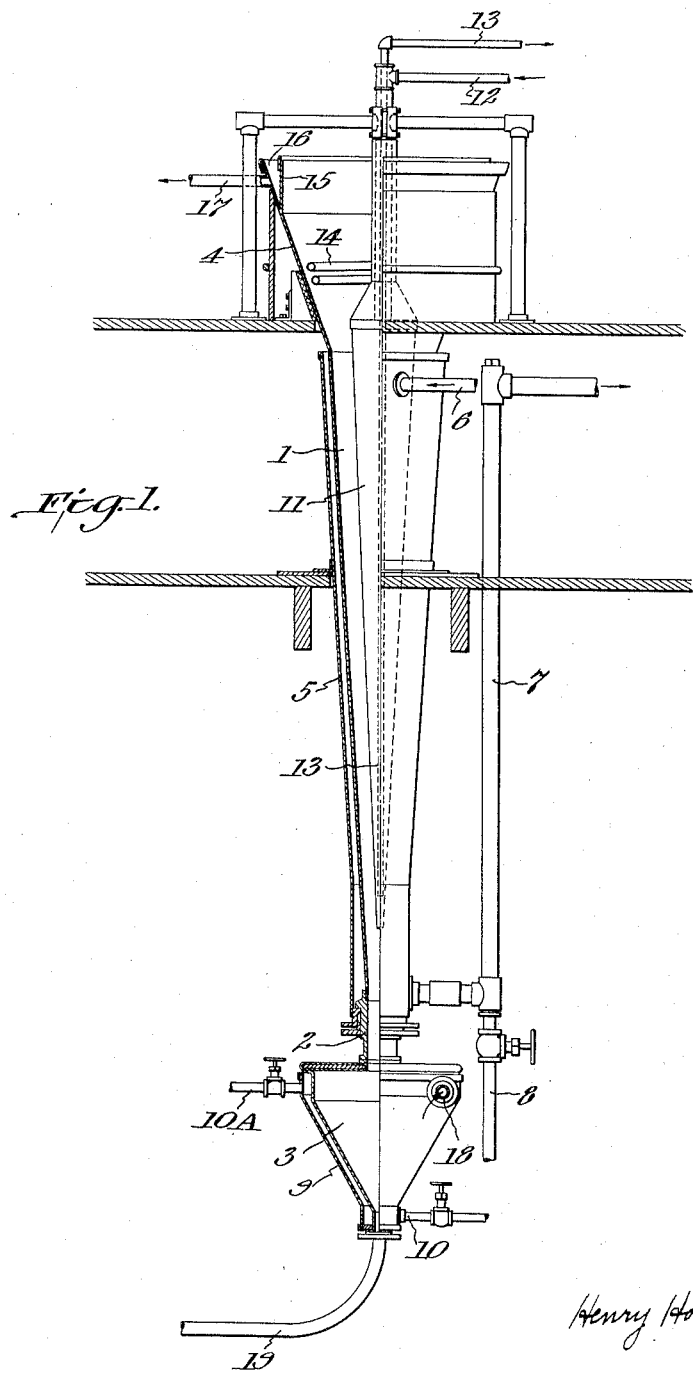

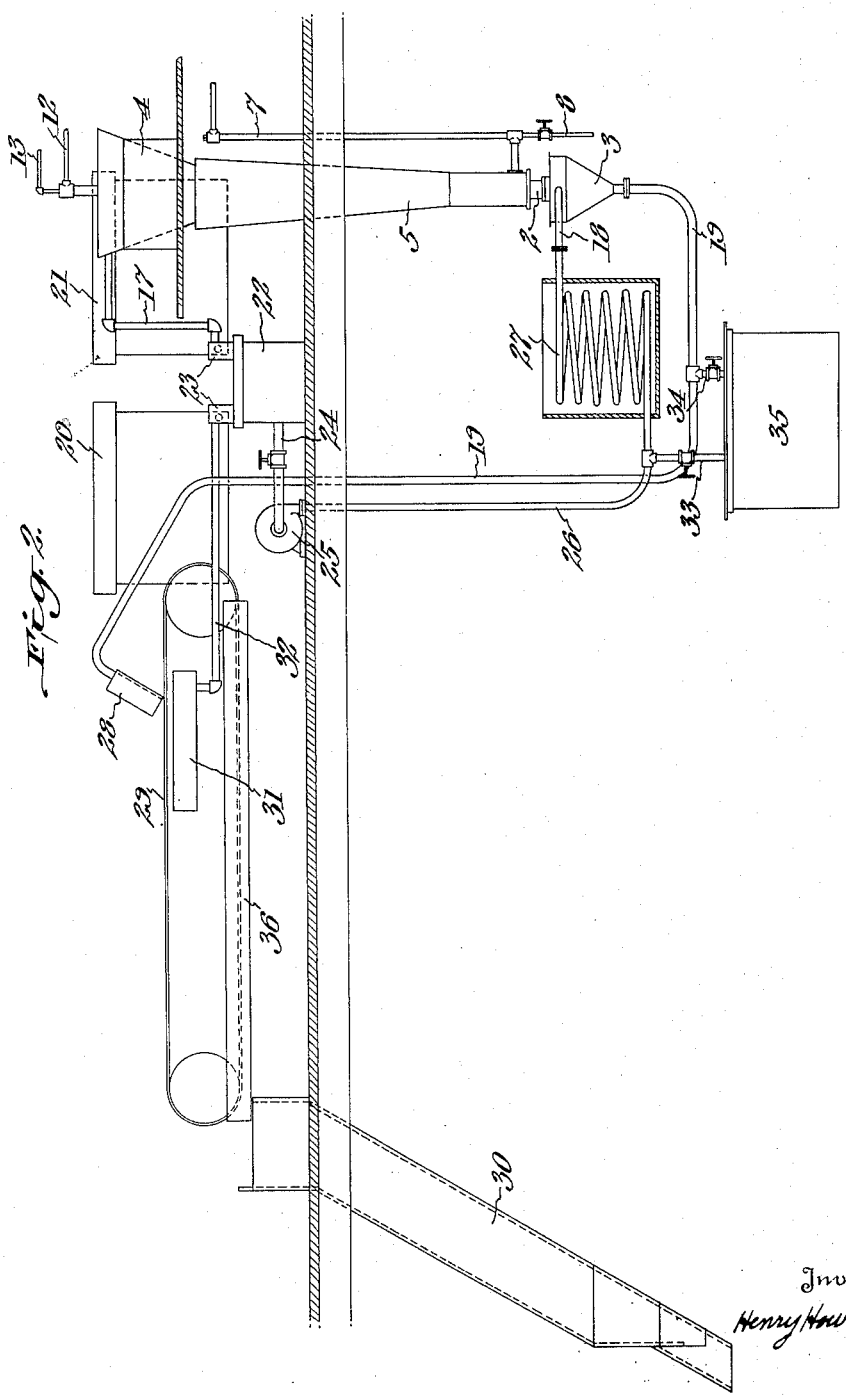

1,560,473

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

CONTINUOUS CRYSTALLIZING APPARATUS.

Application filed May 19, 1924. Serial No. 714,515.

*To all whom it may concern:*

Be it known that I, HENRY HOWARD, a citizen of the United States, residing at Cleveland, in the county of Cuyahoga and State of Ohio, have invented certain new and useful Improvements in Continuous Crystallizing Apparatus, of which the following is a specification.

In my application Ser. No. 649,715, filed July 5, 1923, I have described a process and apparatus for crystallizing soluble substances from solution. One feature of said process is that the crystallization is caused to take place in an upwardly flowing current of the crystallizing solution. In this way crystals formed are maintained in suspension until they have grown to a predetermined size at which they fall downwardly through the upwardly flowing current of crystallizing solution into a collecting means, thus producing a crystal product of a uniform predetermined size. A feature of the apparatus is the provision of a crystallizing vessel of a suitable shape, for instance, having upwardly diverging side walls, for handling the crystallizing solution and growing crystals as described.

The present invention relates to an improvement in the apparatus and particularly in the crystallizing vessel for use in carrying out the process of said application.

A crystallizing vessel in accordance with a preferred embodiment of my present invention is illustrated in vertical section in Fig. 1 of the accompanying drawings.

Fig. 2 is a vertical elevation of the main parts of a plant including the crystallizing vessel illustrated in Fig. 1 associated with accessory apparatus for handling solutions and crystallized salts.

Referring to Fig. 1, the crystallizing vessel 1 is a relatively tall and narrow conical receptacle, the lower end of which communicates through the pipe 2 with the substantially conical but relatively short vessel 3. At the upper end of the vessel 1 the walls diverge outwardly at a greater angle, forming the relatively short and wide conical chamber 4. The crystallizing vessel 1 is enclosed by a cooling jacket 5 supplied with cooling water through the pipe 6. The cooling water after passing downwardly through the jacket discharges through the pipe 7. The jacket may be drained through the valved pipe 8. The vessel 3 is provided with a jacket 9 which may be supplied with a heating agent such as warm water through the pipe 10, leaving through the pipe 10ᴬ. Within the crystallizing vessel 1 is closed hollow conical chamber 11. Cooling water is delivered into the top of chamber 11 through the pipe 12 and is discharged through the pipe 13. Within the chamber 4 is a heating coil 14 and a weir 15 forming the annular channel 16 which communicates with the crystallizing solution discharge pipe 17. Crystallizing solution is supplied through the pipe 18 and crystals formed in the crystallizing vessel 1 and collected in 3 are discharged through the pipe 19.

Referring now to Fig. 2, 20 and 21 are two storage tanks for solution to be crystallized. These tanks 20 and 21 supply the receiving tank 22 through suitable meters 23, 23, the solution flowing then through the pipe 24, pump 25, pipe 26 and cooling coil 27 into the pipe 18 which, as stated above, supplies solution to the crystallizing apparatus. The pipe 19 delivers into the spreader 28 which delivers the mixture of crystals and solution coming from the bottom of the crystallizing apparatus onto the perforated or wire mesh belt dryer 29 from which the dried crystals are delivered into the storage bin 30. Solution which drains through the belt 29 is collected in the trough 31 and delivered back into the receiving tank 22 through the pipe 32. The pipe 17 delivers solution overflowing from the crystallizing apparatus back into the receiving tank. The pan 36 contains water for washing the belt on its return passage.

The pipes 19 and 26 are provided with valved outlets 33 and 34 positioned to deliver into the sump tank 35 for draining the whole apparatus.

The apparatus may be made of any suitable material, for instance, for handling sodium hyposulfite all parts of the apparatus which come into contact therewith may be made of tin plate while the other parts such as the cooling jacket 5 may be made of iron or other suitable material.

For clearness many of the details of a plant designed for commercial operation including pumps and driving mechanism therefor, water supply pipes, etc., have been omitted from the drawings. Such details may be supplied by a chemical engineer and form no part of the present invention.

The operation of the apparatus is as follows:

The apparatus is charged with the solution from which a salt is to be crystallized. As the crystallization proceeds the strength of the solution is maintained by the addition of concentrated solution metered from one of the storage tanks 20 and 21 into the receiving tank 22 and the mixture flows therefrom by way of pipe 24, pump 25, pipe 26, cooler 27 and pipe 18 into the vessel 3. A part of the solution delivered into vessel 3 flows upwardly through the pipe 2 and the crystallizing vessel 1 where it is cooled by contact with the outer walls thereof and with the walls of the chamber 11 to the crystallizing point. As soon as the crystals formed in the crystallizing vessel 1 reach a sufficient size which of course is determined by the rate of flow of the solution, they fall downwardly through the pipe 2 into the vessel 3 and are carried by a portion of the solution delivered thereto by the pipe 18 through the pipe 19 to the dryer 29. The rate of flow of solution through the crystallizing vessel 1 and the pipe 19 is controlled by adjustment of the valve 24 and the height of the discharge end of pipe 19. Valve 24 controls the supply of solution to the apparatus, while adjustment of the height of the discharge end of pipe 19 determines the division of the supply of solution between the crystallizing vessel and the pipe 19. Pipe 19 has a flexible coupling or hinge, not illustrated, and its discharge end is slidable in the spreader 28. The dried crystals are delivered into the bin 30 and solution delivered to the dryer with the crystals collects in the trough 31 and is delivered back into the receiving tank 22 through the pipe 32. In the chamber 4 the rate of flow of the solution is considerably reduced due to the increased cross-sectional area of the body of liquid maintained therein. This permits fine crystals which are carried upwardly with the solution into the chamber 4 to remain and grow until they are heavy enough to drop back into the crystallizing vessel. The heating coil 14 may be used to heat the solution in the chamber 4 and thus melt or dissolve any excess of fine crystals. The weir 15 of course serves to avoid the production of strong currents in the solution in the chamber 4 by the discharge of solution through the pipe 17. The receiving tank 22 serves to collect the overflow from the weir 15 and the return flow from the dryer through pipe 32 and mix with this liquor the concentrated solution from the storage tanks 20 and 21, in order to make up in the liquor the salt which crystallized out in the column. It is noted in this connection that when coarse grained crystals are to be produced the number of seed crystals present in the solution must be carefully regulated. As a result of the cooling of the solution in the crystallizing vessel salt is deposited from the solution upon the crystals suspended in the solution causing them to grow and at the same time primary crystallization is apt to take place, giving an excessive number of seed crystals. By the use of the heating coil 14 the desired quantity of seed crystals in the solution may be maintained.

In crystallizing solutions for the production of large grained crystals in accordance with my invention the crystals must not only be held in suspension until they have had opportunity to grow to the desired size at the same time classification being effected by the action of the upwardly flowing current of solution, but also, in order to secure satisfactory results, the cooling of the solution must be gradual and uniform in order to avoid excessive primary crystallization. A simple conical crystallizing vessel therefore is limited to a size which permits of efficient removal of heat from the crystallizing solution through the outside walls. If the distance between the walls of the vessel and most remote parts of the solution is made too great it becomes necessary, in order to cool the whole body of the solution, to cool the side walls rather intensively, and this results in excessive primary crystallization including objectionable crystallization upon the walls of the crystallizing vessel.

In the crystallizing apparatus of my present invention these difficulties are overcome. The size and capacity of the apparatus may be increased to any desired extent within reasonable limits, while at the same time the maximum distance between the external and internal cooling walls and solution to be cooled may be maintained within any desired limits. As will be apparent the crystallizing vessel 1 with the conical cooling chamber 11 is substantially equivalent to a plurality of separate conical vessels, the combined capacity of which is equal to the capacity of the space between the walls of the vessel 1 and the chamber 11. The single crystallizing vessel of my present invention of course is less expensive to construct, requires less labor for its operation and occupies less space than a plurality of separate conical vessels of equal capacity.

It is to be understood that the invention is not limited to a conical crystallizing vessel, although this shape is preferred. The crystallizing vessel may have a square, rectangular, pentagonal, or any other suitable cross-sectional shape without departing from my invention. It is also within the scope of my invention to make the side walls of the crystallizing vessel 1 and the cooling chamber 11 cylindrical with the lower ends thereof only tapered or conical.

It is further to be understood that although in the preferred embodiment of my invention the crystallizing column is annular in cross-section, certain other shapes are in all respects equivalent thereto and are to be regarded as falling within the scope of my invention. Thus the cross-sectional dimensions of an annular chamber may be embodied in a column of elongated cross-section, enclosed by either plane or curved walls. In other words one may conceive the annular chamber as either partially or wholly opened out or flattened, without altering in any way its essential characteristics so far as the present invention is concerned, of providing such proper relation of cross-sectional area to perimeter (or of volume to cooling surface) as will permit the crystallizing column to be constructed in large units as hereinbefore described. The word "annular" is used therefore in the claims to include such other structural cross-sections as are operatively equivalent thereto.

I claim:—

1. Crystallizing apparatus comprising an annular vessel, the inner and outer walls of which diverge upwardly, and means for applying a cooling medium to the inner surface of the inner wall.

2. Crystallizing apparatus comprising a conical vessel and means for cooling the outer walls thereof, a conical closed chamber positioned within and concentric with said vessel, and means for supplying a cooling fluid to said chamber.

3. Crystallizing apparatus comprising a conical vessel, a conical chamber positioned in and concentric with said vessel, thus forming an annular space of increasing cross-sectional area in an upward direction, said conical chamber being closed to said annular space.

4. Crystallizing apparatus comprising an inner wall and an outer wall defining an annular space of progressively increasing cross-sectional area in an upward direction, means for applying a cooling medium to the inner surface of the inner wall and means for applying a cooling medium to the outer surface of the outer wall.

In testimony whereof, I affix my signature.

HENRY HOWARD.